United States Patent [19]
Kanevsky et al.

[11] Patent Number: 6,092,192
[45] Date of Patent: Jul. 18, 2000

[54] APPARATUS AND METHODS FOR PROVIDING REPETITIVE ENROLLMENT IN A PLURALITY OF BIOMETRIC RECOGNITION SYSTEMS BASED ON AN INITIAL ENROLLMENT

[75] Inventors: Dimitri Kanevsky, Ossining, N.Y.; Stephane Herman Maes, Danbury, Conn.

[73] Assignee: International Business Machines Corporation, Armonk, N.Y.

[21] Appl. No.: 09/008,125

[22] Filed: Jan. 16, 1998

[51] Int. Cl.[7] ........................................................ H04L 9/00
[52] U.S. Cl. ......................... 713/186; 713/172; 713/182; 382/115
[58] Field of Search .................................. 382/115, 224, 382/126; 713/151, 186, 153, 161, 165, 168, 172, 182

[56] References Cited

U.S. PATENT DOCUMENTS

| | | |
|---|---|---|
| 4,274,139 | 6/1981 | Hodgkinson et al. . |
| 4,653,097 | 3/1987 | Watanabe et al. . |
| 5,127,043 | 6/1992 | Hunt et al. . |
| 5,181,238 | 1/1993 | Medamana et al. . |
| 5,216,720 | 6/1993 | Naik et al. . |
| 5,274,695 | 12/1993 | Green . |
| 5,365,574 | 11/1994 | Hunt et al. . |
| 5,465,290 | 11/1995 | Hampton et al. . |
| 5,499,288 | 3/1996 | Hunt et al. . |
| 5,513,272 | 4/1996 | Bogosian, Jr. . |
| 5,517,558 | 5/1996 | Schalk . |
| 5,608,784 | 3/1997 | Miller ........................................ 379/88 |
| 5,633,947 | 5/1997 | Sibbald .................................... 382/124 |
| 5,657,389 | 8/1997 | Houvener . |
| 5,805,719 | 9/1998 | Pare, Jr. et al. ......................... 382/115 |
| 5,838,812 | 11/1998 | Pare, Jr. et al. ......................... 382/115 |
| 5,915,035 | 6/1999 | Hsiao et al. ............................. 382/125 |
| 5,920,642 | 7/1999 | Merjanian ............................... 382/126 |
| 5,937,557 | 8/1999 | Bowker et al. ......................... 42/70.01 |

OTHER PUBLICATIONS

Bruce Schechter, "The Body Electric" IBM Research, No. 1, pp. 14–17, 1997.

IBM Tech. Discl. Bulletin vol. 37 #92B Feb. 1994 p. 189 "VoicePrint Security for Credit Cards" Anon.

Information Week Aug. 18, 1997 p. 36 Anon. "Biometrics—Body Language—Fingerprints, Faces, Even Eyes are The New Keys to Protecting . . . ".

*Primary Examiner*—Thomas R. Peeso
*Attorney, Agent, or Firm*—F. Chau & Associates, LLP

[57] ABSTRACT

Apparatus for providing repetitive enrollment in a plurality of biometric recognition systems based on an initial enrollment is provided. The apparatus includes an extractor for extracting a biometric attribute from a user. Further, a server is included, operatively coupled to the extractor, for interfacing with the plurality of biometric recognition systems to receive requests for biometric attributes therefrom and transmit biometric attributes thereto. The server has a memory device for storing the biometric attribute.

25 Claims, 2 Drawing Sheets

APPARATUS AND METHODS FOR PROVIDING REPETITIVE ENROLLMENT IN A PLURALITY OF BIOMETRIC RECOGNITION SYSTEMS BASED ON AN INITIAL ENROLLMENT

BACKGROUND OF THE INVENTION

1. Technical Field

The present invention relates to biometric identification and, more particularly, to apparatus and methods for providing repetitive enrollment in a plurality of biometric recognition systems based on an initial enrollment.

2. Discussion of Related Prior Art

In many instances it is necessary to verify that an individual requesting access to a service or a facility is in fact authorized to access the service or facility. Such services may include, for example, banking services, telephone services, credit card services, while the facilities may be, for example, banks, computer systems, or database systems. In such situations, users typically have to write down, type or key in (e.g., on a keyboard) certain information in order to send an order, make a request, obtain a service, perform a transaction or transmit a message.

Verification or authentication of a customer prior to obtaining access to such services or facilities typically relies essentially on the customer's knowledge of passwords or personal identification numbers (PINS) or by the customer interfacing with a remote operator who verifies the customer's knowledge of information such as name, address, social security number, date of birth, or mother's maiden name. In some special transactions, handwriting recognition or signature verification is also used.

However, such conventional user verification techniques present many drawbacks. First, information typically used to verify a user's identity may be easily obtained. Any perpetrator who is reasonably prepared to commit fraud usually finds it easy to obtain such personal information such as the social security number, mother's maiden name or date of birth of his intended target. Regarding security measures for more complex knowledge-based systems which require passwords, PINS or knowledge of the last transaction/message provided during the previous service, such measures are also not reliable mainly because the user is usually unable to remember this information or because many users write the information down thus making the fraudulent perpetrator's job even easier. For instance, it is known that the many unwitting users actually write their PIN on the back of their ATM or smart card.

The shortcomings inherent with the above discussed security measures have prompted an increasing interest in biometric security technology, i.e., verifying a person's identity by personal biological characteristics. Several approaches are known, such as, for example, voice print, face recognition (including underlying bone structure), signature recognition, face temperature infrared pattern, hand geometry, fingerprint and retinal print.

Generally, biometric verification/identification requires that a person to be verified/identified undergo an enrollment phase. Furthermore, each person must repeatedly enroll for all the existing systems that will require or provide such biometric functions. The enrollment phase in a biometric verification system requires the individual to be enrolled to provide a biometric trait(s) for subsequent use in verification. For example, with respect to speaker verification, the user may provide an acoustic utterance(s) during the enrollment phase that will be used in a comparison with subsequent utterances to verify that the subsequent utterance(s) is from the same person that provided the enrollment utterance. Similarly, with respect to user identification via fingerprints, a user may provide a fingerprint via, for example, a scanner that is compared to subsequent furnishings of a fingerprint to verify if the individual providing the subsequent fingerprints is the same person that provided the enrollment fingerprint.

Of the known biometric approaches, one such approach is voice-based or voice print verification, which characterizes a speaker based on his or her voice. Voice print verification is based on the premise that each person can be uniquely identified by their voice.

Voice print verification can be used to, for example, program specific appliances, identify later occurrences of a user, pre-program the alarm of a rented car or of a hotel room, restrict access to certain services to a particular user or group of users, and verify speech signature of a document or an oral order or command. As further examples, implementations of speaker recognition in a voice dialing system are described in the following patent applications, the disclosure of which are both incorporated by reference: IBM Docket No. YO997-234, entitled "Systems and Methods for Access Filtering Employing Relaxed Recognition Constraints"; and U.S. Ser. No. 08/908,121, filed on Aug. 11, 1997, and entitled "Apparatus and Methods for User Identification to Deny Access or Service to Unauthorized Users". In the context of voice dialers, where a user states one of a number of enrolled names and is connected to the phone number associated with the enrolled name, it is implicit that all users of the system enroll with the system (i.e., provide a sample utterance(s) for subsequent use in voice/speaker identification/verification). Similarly, other applications implementing voice print verification also require the user to complete an enrollment phase. In fact, all existing biometric verification systems require that the user complete an enrollment phase, i.e., provide a sample of the biometric attribute that is to be subsequently verified.

Thus, with respect to biometric recognition systems, in addition to the burden of having to enroll (i.e., provide biometric samples) with every biometric recognition system the user intends to interact with, existing methods of providing or storing biometric attributes also have their shortcomings. For example, in the context of verifying that an individual requesting access to a service is in fact authorized to access the service, U.S Pat. No. 5,513,272, entitled "System For Verifying Use Of A Credit/Identification Card Including Recording Of Physical Attributes of Unauthorized Users", describes a method for verifying an authorized user of a credit/identification card which is capable of detecting whether the card has been tampered with or changed. As an example, the patent discloses that a fingerprint on a card may be verified against the user's fingerprint and to a fingerprint of the owner of the card in an accessible database.

However, it would be highly advantageous to provide the biometric information in a medium more secure than merely disposing the biometric information on a credit card which may be lost or perhaps even successfully tampered with. Furthermore, it would be highly advantageous to provide the biometric information in a medium easily accessible yet guarded against unauthorized access. More specifically, there is a need for providing the biometric information in a medium accessible to other biometric verification/identification systems so that the biometric information need be provided only once, yet may be used by multiple biometric verification/identification systems for subsequent enrollment (e.g., providing a biometric attribute sample) and registration (e.g., obtaining the status of an authorized user) therein. In this way, a user need enroll (e.g., provide biometric information) only once and that information may be subsequently accessed and utilized by multiple biometric recognition systems for registration of the user without further enrollment (i.e., the further providing of the biometric information) by the user.

SUMMARY OF THE INVENTION

It is an object of the present invention to provide apparatus and methods for providing the storage and encryption of the information necessary to build a biometric model of the user on a server.

It is another object of the present invention to provide apparatus and methods for accessing such information for the purpose of enrolling a user based on the retrieved information.

It is a further object of the present invention is to provide apparatus and methods for repeatedly enrolling a user on different systems which utilize biometric recognition based on a single individual personal enrollment, i.e., to provide reuseablity and communicability of the enrollment.

To achieve the above and other objects, the present invention provides an apparatus for providing repetitive enrollment in a plurality of biometric recognition systems based on an initial enrollment. The apparatus includes an extractor for extracting a biometric attribute from a user. Further, a server is included, operatively coupled to the extractor, for interfacing with the plurality of biometric recognition systems to receive requests for biometric attributes therefrom and transmit biometric attributes thereto. The server has a memory device for storing the biometric attribute.

To further achieve the above and other objects, the present invention provides a method for providing repetitive enrollment in a plurality of biometric recognition systems based on an initial enrollment. The method includes the steps of: extracting a biometric attribute from a user; and storing the processed biometric attribute in a memory device of a server.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention provides apparatus and methods for allowing repetitive enrollment in a plurality of biometric recognition systems based on an initial enrollment. More specifically, the present invention provides the necessary infrastructure to exchange biometric information between different individuals, organizations and/or institutions. Hereinafter, the term "client" shall be utilized to refer to individuals, organizations and/or institutions that require the biometric information for the purpose of registration (i.e., obtaining the status of an authorized user). The list of clients above is merely exemplary and is not an exhaustive list. It is to be appreciated that, in the prior art, registering with multiple clients required a user to enroll with each client. Enrollment includes providing each client with a biometric sample of a particular biometric trait (i.e., voice print, face recognition, signature recognition, face temperature infrared pattern, hand geometry, fingerprint, retinal print, etc.) so that the sample may be used by each client's biometric recognition system as a test sample. Generally, the previously provided test sample, after relevant processing, is compared against a contemporaneously provided sample at a time when the user seeks access to, for example, the client's services or facilities. The present invention provides apparatus and methods that allow a user to register with multiple systems which utilize biometric recognition without requiring repetitive enrollment by the user.

The present invention includes a server for storing the biometric attributes. Servers are powerful computers that perform functions such as delivering information or Web pages, hosting databases, or handling e-mail. Clients request information from servers which, after processing, then send the information back to the client. The internet works on the client/server model of information delivery. In this model, a client computer connects to a server computer on which information resides; the client depends on the server to deliver information. In effect, the client requests the services of the larger computer. These services may involve searching for information and sending it back to the client, such as when a database on the Web is queried.

The connection to the server is made, for example, via a LAN (local area network), a phone line, or a transmission control protocol/internet protocol (TCP/IP) based WAN (wide area network) on the Internet. A primary reason to set up a client/server network is to allow many clients to access the same applications and files that are stored on a server. Accordingly, the present invention advantageously allows many clients, e.g., individuals, organizations and/or institutions utilizing biometric recognition systems, to access the biometric attributes of a user for subsequent enrollment into that client's biometric recognition system.

Figure 1:
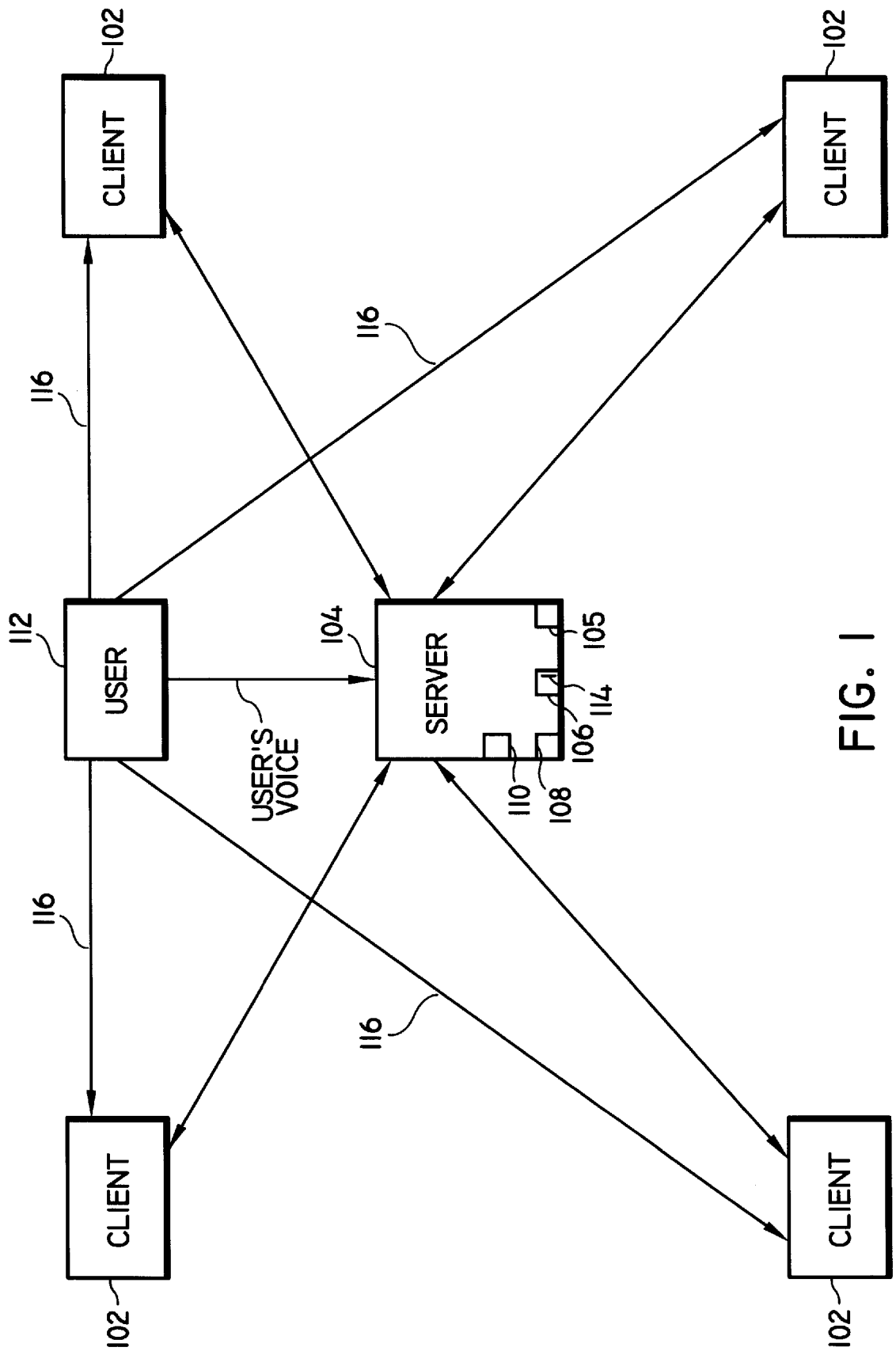
FIG. 1 is a block diagram illustrating an apparatus according to an embodiment of the present invention interfaced with a user and various clients.

In an illustrative example, an apparatus for providing repetitive enrollment in a plurality of biometric voice recognition systems based on an initial enrollment 100 (hereinafter the "apparatus") is provided. Furthermore, the apparatus is accessible via the internet, as shown in FIG. 1. FIG. 1 is a block diagram illustrating the apparatus interfaced with a user and various clients, according to the illustrative example. The clients 102 that require the biometric information may be connected to the internet via terminal emulation (e.g., VT-100), direct connection, serial line internet protocol (SLIP), point-to-point protocol (PPP), cable modem, integrated service digital network (ISDN), or on-line services (e.g., CompuServe, America Online, etc.). Referring to FIG. 1, a server 104 includes a processor 105, a memory device 106, a voice print extractor 108, and an encryption device 110. A user 112 utilizes the voice print extractor 108 which extracts his or her voice print from a spoken utterance. Then, the extracted voice print is encrypted by the encryption device 110 and outputted as an encrypted computer file 114. The encrypted file 114 is stored in the memory device 106 of the server 104. The user 112 then provides accessing information 116 (e.g., a server address, a login, a password, and a public decryption key) to the clients 102 that require his or her biometric attributes. The communication of the accessing information 116 (server address, login, etc.) can occur a number of ways, such as, for example, via business card, e-mail, by voice, in writing or by form filing. Then, the clients 102 can access the server 104 and the encrypted file 114 containing the user's biometric information for subsequent enrollment into their biometric recognition systems. The clients 102 decrypt the encrypted file 114 using the public key.

In illustrative embodiments of the present invention, the biometric characteristic considered is voice print. It should be understood that the present invention is usable with any voice recognition system and is not, in any way, limited to use with or dependent on any details or methodologies of any particular voice recognition arrangement with which the invention may be employed. Furthermore, it should be understood that the present invention is applicable to all types of biometric verification/identification systems and is not, in any way, limited to voice print. The present invention is also applicable to non-biometric attributes. Additionally, while the extractor 108 and encryption device 110 are shown as part of the server 104, they may be separate from the server 104 and even at a remote location from the server 104, but operatively connected to the server 104 (via, for example, the internet). Furthermore, it is to be appreciated that the extractor 108 and encryption device 110 are functional in nature and, thus, may be implemented in hardware, software or a combination thereof. However, in preferred embodiments, apparatus and methods of the present invention are implemented as software modules on one or more appropriately programmed general purpose computers (e.g., server 104) having a processor(s), memory (e.g., memory device 106) and input/output interfaces associated therewith for executing the functions associated with the main components of the invention. Of course, special purpose processors may be employed. Given the teachings provided herein, one of ordinary skill in the art will contemplate various other implementations of the functional components of the present invention.

The present invention encompasses multiple possible embodiments of apparatus and methods for providing repetitive enrollment in a plurality of biometric recognition systems based on an initial enrollment. Among the different architectures, the following discussion is directed to centralized systems offering biometrics hosting or repository for multiple users or the possibility to have individual personal servers. However, any intermediate distributed architecture can also be considered by combination of the two approaches.

Figure 3:
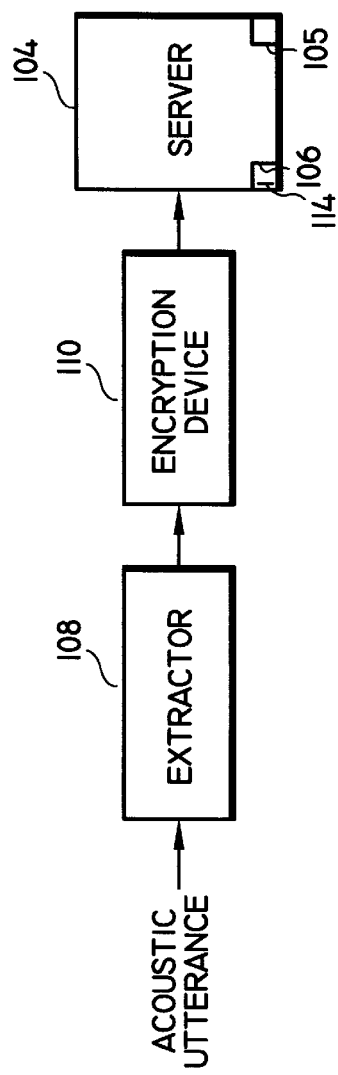
FIG. 3 is a block diagram of an apparatus for providing repetitive enrollment in a plurality of biometric voice recognition systems based on an initial enrollment according to an embodiment of the present invention.
Figure 2:
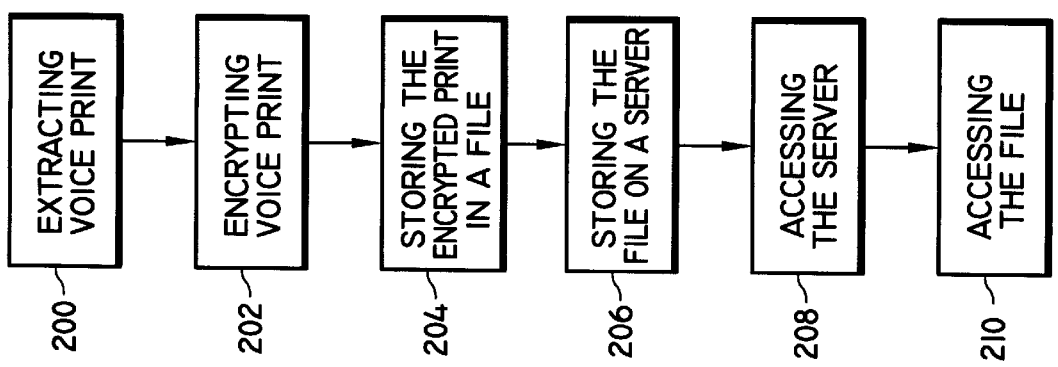
FIG. 2 is a flow chart of a method for providing repetitive enrollment in a plurality of biometric voice recognition systems based on an initial enrollment according to an embodiment of the present invention.

The illustrative embodiments of the present invention provide both apparatus and methods for allowing repetitive enrollment in a plurality of biometric voice recognition systems based on an initial enrollment. FIG. 2 is a flow chart of a method according to the present invention and FIG. 3 is a block diagram of an apparatus according to the present invention. The following descriptions of the various embodiments of the present invention shall reference both apparatus and methods simultaneously so that the following description simultaneously describes both the method of FIG. 2 and the apparatus of FIG. 3.

Thus, referring to FIGS. 2 and 3, the core of the various embodiments is substantially the same, starting with an extraction phase (step 200 of FIG. 2). A user utilizes a voice print extractor 108 to create a voice print. The extractor 108 can be provided by any of a number of different parties, such as, for example, the server provider, the service provider (i.e., the client), or the vendor of the biometric verification system (via the biometric verification engine). Additionally, the extractor 108 can be provided via an application implementing biometric verification. In the case where the extractor 108 is provided by the server provider, users can enroll, for example, by connecting to the server 104 and following instructions on a web page. As a further example, in the case of speaker recognition, an ActiveX control, plug-in or java applet may be utilized to collect speech, encrypt it, and send it to the server 104. In the case that the extractor is provided by the service provider (the client), the user may be enrolled, for example, when the user first registers to the service (i.e., when the status of an authorized user is first sought). Thus, enrollment could occur, for example, in a bank branch, ATM, or kiosk. Alternatively, the service provider could send the user a kit having an extractor (via, e.g., e-mail) or, the user could provide a tape recording of his voice to the service provider. The aforementioned techniques for extracting a voice print are illustrative and the present invention is not limited to any particular technique.

As mentioned earlier, the vendor of the biometric verification system may provide the extractor via the biometric verification engine. It is to be appreciated that the speaker recognition engine could be text-dependent or text-prompted (i.e., where the text of an utterance is prompted by the speech recognizer and recognition depends on the accuracy of the words uttered as compared to the prompted text), or the engine may be text-independent (i.e., where the utterances of the speaker are used to perform recognition by comparing the acoustic characteristics of the speaker with acoustic models of previously enrolled speakers, irrespective of the words uttered). Preferably, the speaker recognition system employed in accordance with the present invention is the system which performs text-independent speaker verification and asks random questions, i.e., a combination of speech recognition, text-independent speaker recognition and natural language understanding as disclosed in U.S. Ser. No. 08/871,784, filed on Jun. 11, 1997, and entitled "Apparatus and Methods for Speaker Verification/Identification/Classifying Employing Non-Acoustic and/or Acoustic Models and Databases", the disclosure of which is incorporated herein by reference. However, while text-independent speaker verification is preferred, it is to be understood that the present invention is not limited to any particular method of speaker recognition.

In extracting the voice print, the following three illustrative categories of extractors are hereinafter discussed: (1) an extractor that simply records speech from the user; (2) an acoustic front-end that is able to extract physiologically related features like cepstra; and (3) an actual speaker model extractor, which will build the models necessary to recognize the user based on the speech provided by the user. While any type of extractor may be used, the particular choice must be carefully considered since compatibility and security issues are implicated for each particular choice. According to a preferred embodiment of the present invention, an extractor that simply records speech is used to enroll the user. Since the recorded speech represents raw data (i.e., audio waveform signals), it is the most convenient way to enroll users independent of the technology used by the client to perform speaker recognition, provided that it works in text-independent mode, as disclosed in the above-referenced patent application, (Docket Number YO996-188), entitled "Text Independent Speaker Recognition for Transparent Command Ambiguity Resolution and Continuous Access Control". For text-dependent or text-prompted speaker recognition systems, the text required to be spoken by the user must be carefully selected (i.e., strings of digits, user selected password, etc.).

Alternatively, if the use of an acoustic front-end is required, that would imply that the server provider supports only some vendors or technologies, i.e., only those that utilize the actual features extracted. In the case that an actual speaker model extractor is required, then clearly the server provider supports only a given vendor or technology. Thus, use of an extractor that simply records speech (i.e., raw data) from the user is favored for system to system compatibility (i.e., server system to speaker recognition system). It is to be appreciated that while all three illustrative extractor types may be utilized, the use of audio waveform signals (i.e., raw data) presents a greater security risk and thus, the waveforms should be carefully distributed with sufficient safeguards in place (such as, for example, password and decryption key). This concern is also applicable to other biometric recognition systems, such as, for example, fingerprint recognition, where the fingerprints are digitized. However, since all of the extractor types have their benefits and drawbacks, the particular extractor selected should depend on the application and other factors, such as, for example, the person from whom the voice print is to be extracted (e.g., a person having a high security clearance in a restricted facility may require his print to be guarded more carefully since his or her voice print could provide greater access to restricted areas).

Compatibility between the server and client systems is also implicated by the storage format of the biometric attribute on the server (e.g., in the case of speaker identification, the storage format could either be audio waveform signals, acoustic features, or acoustic models). For example, if there is a generally accepted standard for the storage of a particular biometric attribute and that standard is implemented to store the attribute on the server, compatibility will likely exist between most recognition systems of that type and the server with respect to accessing the particular attribute from the server. Thus, the recognition systems that are to retrieve the biometric information from the server need not come from the same vendor, as long as the different vendors utilize the same standard. Further, if the biometric attribute is stored in a format corresponding to raw data (e.g., waveforms in the case of a speaker recognition system), the data may be utilized by most, if not all, recognition systems irrespective of the vendor or technology employed. However, if the biometric attribute is not in a raw data format, nor in a generally accepted format (e.g., in the case of acoustic models for a speaker recognition system), then all client systems may be constrained to one particular vendor. Thus, the selection of a particular format for storing the biometric attribute plays a significant role in the compatibility of the server with biometric recognition systems. Furthermore, the same considerations are implicated with respect to non-biometric attributes which may also be stored on the server.

Referring back to FIGS. 2 and 3, the extraction phase (step 200) is combined with an encryption phase (step 202). An encryption device 110 encrypts the waveforms, set of features, or models, corresponding to the three example categories of voice print extractors, with a private key to provide secure transaction of the signals over, for example, the telephone line. A public key is also provided. A number of known encryption techniques or algorithms can be used for the encryption process. See, for example, the encryption algorithms described in "Applied Cryptography", by Bruce Schenier, second edition, Wiley, 1996. The result of the encryption phase (step 202) may be stored in a single encrypted file 114 (step 204).

The encrypted file 114 is stored in the memory device 106 of the server 104 (step 206). According to the current state of technology, an internet webserver, gopher, file transfer protocol (ftp), or e-mail server are the most convenient types of servers. A webserver processes requests from clients for information, locates the information, and then sends the information to the client (more specifically, the client's web browser). Additionally, a client may interface with a webserver via a socket transaction (a transaction using TCP/IP) using ActiveX, java applet or java stand alone, etc. A gopher server is a menu based server. From a main menu (i.e., root gopher), a client chooses an item of interest, which is frequently another menu (i.e., sub-menu), and keeps burrowing until he or she reaches the information they want. An FTP server provides a listing of files that are accessible to the client. Further, while a packet-switched network (e.g., the internet, where there is no single, unbroken connection between sender and receiver; instead, when information is sent, it is broken into small packets and sent over many different routes at the same time and then reassembled at the receiving end) is preferred, a circuit-switched network (e.g., a telephone call, where once a connection is made, that part of the network is dedicated to only that single connection) may also be used. The aforementioned servers, networks, and protocols are illustrative and others can be utilized. Depending if the server is personal to the user, provided by a service provider (e.g., via the internet) or shared among a restricted number of users (e.g, all the employees of a company utilize the same server), the size and scope of the distribution architecture may vary accordingly (e.g., internet, intranet, LAN, WAN, etc.).

To access the server 104 (step 208), a given address (e.g., internet protocol (IP) or universal resource locator (URL)) is used. To access the encrypted file 114 (step 210), a given protocol (e.g., hypertext transfer protocol (http), gopher, ftp, or e-mail) is used. Furthermore, a login and password address may be required to access the file 114.

The user provides the clients who need his voice print with a server address, a login, a password, and a public decryption key. This communication can be done via business card, e-mail, by voice, in writing or by form filing. Additionally, the communication of this information is particularly adapted for transfer via personal area network (PAN). A PAN links devices (e.g., pagers, personal digital assistants (PDAs), wristwatches, etc.) carried in, for example, people's pockets through a physical contact such as a handshake. Thus, business cards and other information can be transmitted in this way. The low data rate of the PAN is sufficient to transfer, for example, a server address, a login, a password, and a public decryption key. For an article discussing the development and use of PANs, see "The Body Electric", by Bruce Schechter, appearing in IBM Research, Number 1, pp. 14–17, 1997. Similarly, any method or apparatus that facilitates a communication or exchange of information between systems or individuals can be utilized, such as, for example, infrared (IR), wireless, etc. As a further example, smartcards may be used to facilitate the communication of information. The smartcard may be read at a designated location (e.g., the location of the client providing a service) or the card may be forwarded to the client and disposed of after the relevant information has been retrieved. The information may be stored in an encrypted form in the card, with physical access to the internal card circuitry protected by tamper-proof (self-destructive) sealing. It is to be appreciated that for added security, the transmission of the public decryption key can also rely on the address of a key server also protected by a login and password.

The present invention embodies numerous applications where biometric information may be utilized. In the case where a user has biometric information stored on the server, that information may be accessible by clients for the purpose of enrollment in their biometric recognition systems. The present invention may be utilized to provide biometric information in order to obtain authorization to engage in certain activities. For example, while credit card (magnetic card) use may rely on a store employee's visual inspection and comparison of a signature on the card and a contemporaneous signature by the intended user, other activities such as activating the card or gaining access to the user's current financial statement may utilize biometric recognition via the card provider. Additionally, in the previous example, the present invention may be utilized to retrieve biometric attributes when there is a question regarding the matching of the signatures, i.e., when it is not so clear that the person intending to use the credit card is indeed the authorized user. Alternatively, biometric attributes may be forwarded to the server for subsequent recognition/verification. For example, a store employee may extract a biometric attribute of a customer and send the data (e.g., raw data, features or models in the case of voice recognition) to the server provider for verification. In another embodiment, the customer may have his or her biometric attributes stored on a personal server (e.g., his or her own computer) and may provide a URL, decryption key, and login which the store employee forwards to the server provider (i.e., a second server) for subsequent verification of the biometric attribute and thus, the customer's identity. In either case, an accept or reject statement (i.e., a response indicating the result of the verification process) is forwarded to the store employee based on the verification process performed by the server provider. Thus, the present invention provides the capability for remote smartcard or magnetic card activation/deactivation or password or PIN code change and reactivation, or any other activity where access to such activities (activation, deactivation, etc.) are permitted/restricted upon biometric verification/authentication. The present invention allows the user to simply point (through, for example, the methods described above) the system or individual requiring his or her biometric information to the server. Alternatively, biometric verification may be realized by the server provider whereby an accept or reject statement is provided depending on the outcome of the verification process. It is to be appreciated that despite all the new systems that a user may be required to interact with or provide biometric information to, the user need only enroll once.

While an apparatus according to an embodiment of the present invention has been illustrated using the internet, the apparatus could also communicate directly (e.g., without need for an address, etc) with a client through a telephone line or other media (e.g., wireless).

Additionally, it is to be understood that the present invention is not limited to voice identification. Any type of biometric measure may be stored on the server. For example, such biometric attributes as face temperature infrared pattern, face recognition, signature recognition, hand geometry, fingerprint and retinal print or any combination thereof may be used. It is to be appreciated that the above list is not intended to be exhaustive, rather, other types of biometric attributes may be employed.

Furthermore, apparatus according to the present invention could also store nonbiometric attributes (such as, for example, a PIN, password, answers to personal questions (i.e., personal information, such as, for example, mother's maiden name, etc.) together with biometric attributes so that all attributes of a user are accessible from the server. An implementation of speaker recognition that utilizes answers to questions together with voice print verification to verify or identify individuals is described in U.S. Ser. No. 08/871,784, filed on Jun. 11, 1997, and entitled "Apparatus and Methods for Speaker Verification/Identification/Classification Employing Non-acoustic and/or Acoustic Models and Databases", the disclosure of which is incorporated by reference herein. Thus, through a one time enrollment, a user may provide numerous attributes, including biometric and non-biometric attributes, that may be later selectively accessed by clients for the purpose of registering (i.e., obtaining the status of an authorized user) therewith. Thus, advantageously, the user need only enroll (i.e., provide a biometric and/or non-biometric sample(s)) once, and that biometric and/or non-biometric sample(s) may be subsequently accessed by the clients and utilized by their recognition systems so that the user does not have to individually enroll with each client in order to register with each client. It is to be appreciated that biometric and non-biometric attributes may be utilized in systems implementing dual (biometric and non-biometric) recognition for the purpose of allowing initial access through biometric recognition and subsequent access to varying layers of services through knowledge based recognition (i.e., social security number, password, etc.), or vice versa. Thus, the storing of both biometric and non-biometric attributes on the server allows all attributes of a user to be stored and retrieved for multiple enrollments based on the user's initial furnishing of attributes to the server.

It is to be appreciated that in the case of multiple biometric attributes, server access may be structured (different layers employing additional safeguards such as additional or different passwords) so that only specific attributes of a user are accessible. Thus, for example, a client may access the server and subsequently, a web page pertaining to a user, given the unique identifier for a server (IP address) and the unique identifier for a page (URL). The accessed web page may contain hypertext consisting of hyperlinks (which provide access to other web pages) accessible only after providing additional and varying passwords. The hyperlinks would provide access to different biometric attributes of the user by providing the client access to varying web pages containing the varying biometric attributes.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for providing repetitive enrollment in a plurality of biometric recognition systems based on an initial enrollment, comprising the steps of:
    (a) extracting a biometric attribute from a user;
    (b) storing the biometric attribute in a memory device of a server for subsequent use by any of the plurality of biometric recognition systems; and
    (c) accessing the biometric attribute from the memory device of the server for enrollment in the plurality of biometric recognition systems;
    (d) enrolling in each of the plurality of biometric recognition systems based upon the biometric attribute.

2. The method of claim 1, further comprising the step of encrypting the extracted biometric attribute before storing.

3. The method of claim 1, further comprising the steps of:

(a) extracting a non-biometric attribute from the user; and (b) storing the non-biometric attribute in the memory device of the server for subsequent use by any of the plurality of biometric recognition systems.

4. The method of claim 1, wherein the extracted biometric attribute is a digitized fingerprint.

5. The method of claim 1, wherein the extracted biometric attribute is stored in a format corresponding to raw data to provide compatibility between the server and the plurality of biometric recognition systems.

6. A method for providing repetitive enrollment in a plurality of biometric recognition systems based on an initial enrollment, comprising the steps of:

(a) extracting a biometric attribute from a user;

(b) encrypting the extracted biometric attribute;

(c) storing the encrypted biometric attribute in a file;

(d) storing the file in a memory device of a server for subsequent use by any of the plurality of biometric recognition systems;

(e) accessing the biometric attribute from the memory device of the server for enrollment in the plurality of biometric recognition systems; and (f) enrolling in each of the plurality of biometric recognition systems based upon the biometric attribute.

7. The method of claim 5, further comprising the steps of:

(a) extracting a non-biometric attribute from the user;

(b) encrypting the extracted non-biometric attribute;

(c) storing the encrypted non-biometric attribute in the file; and (d) storing the file in the memory device of the server for subsequent use by any of the plurality of biometric recognition systems.

8. The method of claim 7, wherein at least one of the plurality of biometric recognition systems is capable of recognizing biometric and non-biometric attributes, said method further comprises the steps of:

accessing the non-biometric attribute from the memory device of the server for enrollment in the at least one of the plurality of biometric recognition systems; and enrolling in the at least one of the plurality of biometric recognition systems based upon the non-biometric attribute.

9. The method of claim 6, wherein the biometric attributes are selected from the group consisting of voice print, face recognition, signature recognition, face temperature infrared pattern, hand geometry, fingerprint, retinal print, and any combination of the aforementioned.

10. The method of claim 7, wherein the non-biometric attributes are selected from the group consisting of a password, a personal identification number (PIN), and personal information.

11. A method for providing repetitive enrollment in a plurality of biometric voice recognition systems based on an initial enrollment, comprising the steps of:

(a) extracting a voice print from a user;

(b) encrypting the extracted voice print;

(c) storing the encrypted voice print in a file;

(d) storing the file in a memory device of a server for subsequent use by any of the plurality of biometric voice recognition systems;

(e) accessing the voice print from the memory device of the server for enrollment in the plurality of biometric voice recognition systems; and (f) enrolling in each of the plurality of biometric voice recognition systems based upon the voice print.

12. The method of claim 11, further comprising the step of accessing the file to enroll with a voice recognition system.

13. The method of claim 11, wherein the extracted voice print is an audio waveform signal.

14. The method of claim 11, wherein the extracted voice print is a set of acoustic features.

15. The method of claim 11, wherein the extracted voice print is an acoustic model.

16. Apparatus for providing repetitive enrollment in a plurality of biometric recognition systems based on an initial enrollment, comprising:

an extractor for extracting a biometric attribute from a user;

a server operatively coupled to said extractor for interfacing with the plurality of biometric recognition systems to receive requests for biometric attributes therefrom and transmit biometric attributes thereto, said server having a memory device for storing the biometric attribute;

means for accessing the biometric attribute from the memory device of the server for enrollment in the plurality of biometric recognition systems; and means for enrolling the user in each of the plurality of biometric recognition systems based upon the biometric attribute.

17. The apparatus of claim 16, further comprising an encryption device operatively coupled to said extractor and said server, for encrypting the biometric attribute before the biometric attribute is stored in the memory device of said server.

18. The apparatus of claim 16, wherein the biometric attribute is selected from the group consisting of voice print, face recognition, signature recognition, face temperature infrared pattern, hand geometry, fingerprint, retinal print, and any combination of the aforementioned.

19. The apparatus of claim 16, wherein the extracted biometric attribute is stored in a format corresponding to raw data to provide compatibility between the server and the plurality of biometric recognition systems.

20. Apparatus for providing repetitive enrollment in a plurality of biometric voice recognition systems based on an initial enrollment, comprising:

an extractor for extracting a voice print from a user; and a server operatively coupled to said extractor for interfacing with the plurality of biometric voice recognition systems to receive requests for voice prints therefrom and transmit voice prints thereto, said server having a memory device for storing voice prints; and means for accessing the voice print from the memory device of the server for enrollment in the plurality of biometric voice recognition systems; and means for enrolling the user in each of the plurality of biometric voice recognition systems based upon the voice print.

21. The apparatus of claim 20, further comprising an encryption device operatively coupled to said extractor and said server, for encrypting the voice print before the voice print is stored in the memory device of said server.

22. The apparatus of claim 20, wherein said extractor records speech from the user as an audio waveform signal.

23. The apparatus of claim 20, wherein said extractor is an acoustic front-end capable of extracting features.

24. Apparatus for providing repetitive enrollment in a plurality of biometric voice recognition systems based on an initial enrollment, comprising:

an extractor for extracting a voice print from a user; and a server operatively coupled to said extractor for interfacing with the plurality of biometric voice recognition systems to receive requests for voice prints therefrom and transmit voice prints thereto, said server having a memory device for storing voice prints, wherein said extractor is a speaker model extractor capable of building models.

25. The apparatus of claim 24, further comprising an encryption device operatively coupled to said extractor and said server, for encrypting the biometric attribute before the biometric attribute is stored in the memory device of said server.

* * * * *